US010313051B2

(12) United States Patent
Greenberg et al.

(10) Patent No.: US 10,313,051 B2
(45) Date of Patent: Jun. 4, 2019

(54) MODULATION AND CODING SCHEME CODES

(71) Applicant: Intel IP Corporation, Santa Clara, CA (US)

(72) Inventors: Maxim Greenberg, Atlit (IL); Assaf Kasher, Haifa (IL); Michael Genossar, Modiin (IL); Igor Gutman, Arad (IL)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/832,201

(22) Filed: Dec. 5, 2017

(65) Prior Publication Data

US 2018/0287732 A1    Oct. 4, 2018

Related U.S. Application Data

(63) Continuation of application No. 14/978,293, filed on Dec. 22, 2015, now Pat. No. 9,847,849.

(Continued)

(51) Int. Cl.
*H04L 1/00* (2006.01)
*H04L 27/20* (2006.01)
(Continued)

(52) U.S. Cl.
CPC .......... *H04L 1/0009* (2013.01); *H04L 1/0003* (2013.01); *H04L 1/0025* (2013.01);
(Continued)

(58) Field of Classification Search
CPC ... H04L 1/0009; H04L 1/0003; H04L 1/0025; H04L 27/2078; H04L 27/34;
(Continued)

(56) References Cited

U.S. PATENT DOCUMENTS 9,559,722 B1 *  1/2017  Huang ................. H03M 13/118
2013/0107853 A1  5/2013  Pettus et al.
(Continued)

OTHER PUBLICATIONS

International Search Report and Written Opinion for PCT Application No. PCT/US2016/052610, dated Dec. 20, 2016, 12 pages.
(Continued)

*Primary Examiner* — Kwang B Yao
*Assistant Examiner* — Moo Jeong
(74) *Attorney, Agent, or Firm* — Eversheds Sutherland (US) LLP

(57) ABSTRACT

This disclosure describes methods, apparatus, and systems related to a modulation and coding scheme (MCS) system. The device may determine a wireless communications channel with a first device in accordance with a wireless communications standard. The device may generate a header in accordance with a communication standard, the header including, at least in part, a modulation and coding scheme (MCS) index value. The device may determine a code rate associated with the MCS index value based at least in part on the wireless communications channel. The device may cause to send the header to the first device over the wireless communications channel based at least in part on the MCS index value.

17 Claims, 6 Drawing Sheets

Related U.S. Application Data

(60) Provisional application No. 62/241,363, filed on Oct. 14, 2015.

(51) Int. Cl.
    *H04L 27/34*     (2006.01)
    *H04W 72/04*     (2009.01)
    *H04L 27/00*     (2006.01)

(52) U.S. Cl.
    CPC ...... *H04L 27/0008* (2013.01); *H04L 27/2078* (2013.01); *H04L 27/34* (2013.01); *H04W 72/04* (2013.01); *H04L 1/0057* (2013.01); *H04L 1/0075* (2013.01)

(58) Field of Classification Search
    CPC . H04L 27/0008; H04L 1/0057; H04L 1/0075; H04W 72/04
    See application file for complete search history.

(56) References Cited

U.S. PATENT DOCUMENTS

| | | |
|---|---|---|
| 2013/0311857 A1 | 11/2013 | Murakami |
| 2014/0185551 A1 | 7/2014 | Sanderovich |
| 2015/0270993 A1 | 9/2015 | Cheung |
| 2016/0241360 A1* | 8/2016 | Motozuka .......... H03M 13/1122 |
| 2016/0330738 A1 | 11/2016 | Eitan |

OTHER PUBLICATIONS

Sai Shankar N. et al., "WiGig and IEEE 802.11ad—for Multi-Gigabyte-Per-Second WPAN and WLAN", Nov. 30, 2012.

Eldad Perahia et al., "IEEE 802.11ad Overview for CWPAN", IEEE 802.11-11/0459r1, May 19, 2011.

* cited by examiner

200

| MCS Index | Modulation | $N_{CBPS}$ | Repetition | Code Rate | Data Rate (Mbps) |
|---|---|---|---|---|---|
| | 802.11ad MCS set | | | | |
| 1 | π/2-BPSK | 1 | 2 | 1/2 | 385 |
| 2 | π/2-BPSK | 1 | 1 | 0.5 | 770 |
| 3 | π/2-BPSK | 1 | 1 | 5/8 | 963 |
| 4 | π/2-BPSK | 1 | 1 | 3/4 | 1155 |
| 5 | π/2-BPSK | 1 | 1 | 13/16 | 1251 |
| 6 | π/2-QPSK | 2 | 1 | 1/2 | 1540 |
| 7 | π/2-QPSK | 2 | 1 | 5/8 | 1925 |
| 8 | π/2-QPSK | 2 | 1 | 3/4 | 2310 |
| 9 | π/2-QPSK | 2 | 1 | 13/16 | 2503 |
| 10 | 16-QAM | 4 | 1 | 1/2 | 3080 |
| 11 | 16-QAM | 4 | 1 | 5/8 | 3850 |
| 12 | 16-QAM | 4 | 1 | 3/4 | 4620 |

Modified MCS Set

| Current MCS Index | Modified MCS index | Modulation | $N_{CBPS}$ | Repetition | Code Rate | Data Rate (Mbps) |
|---|---|---|---|---|---|---|
| 1 | 1 | π/2-BPSK | 1 | 2 | 1/2 | 385 |
| 2 | 2 | π/2-BPSK | 1 | 1 | 0.5 | 770 |
| 3 | 3 | π/2-BPSK | 1 | 1 | 5/8 | 963 |
| 4 | 4 | π/2-BPSK | 1 | 1 | 3/4 | 1155 |
| 5 | 5 | π/2-BPSK | 1 | 1 | 13/16 | 1251 |
| 6 | 6 | π/2-QPSK | 2 | 1 | 1/2 | 1540 |
| 7 | 7 | π/2-QPSK | 2 | 1 | 5/8 | 1925 |
| 8 | 8 | π/2-QPSK | 2 | 1 | 3/4 | 2310 |
| 9 | 9 | π/2-QPSK | 2 | 1 | 13/16 | 2503 |
|   | 10 | π/2-QPSK | 2 | 1 | 7/8 | 2695 |
| 10 | 11 | 16-QAM | 4 | 1 | 1/2 | 3080 |
| 11 | 12 | 16-QAM | 4 | 1 | 5/8 | 3850 |
| 12 | 13 | 16-QAM | 4 | 1 | 3/4 | 4620 |
|   | 14 | 16-QAM | 4 | 1 | 13/16 | 5005 |
|   | 15 | 16-QAM | 4 | 1 | 7/8 | 5390 |
|   | 16 | 64-QAM | 6 | 1 | 5/8 | 5775 |
|   | 17 | 64-QAM | 6 | 1 | 3/4 | 6930 |
|   | 18 | 64-QAM | 6 | 1 | 13/16 | 7508 |
|   | 19 | 64-QAM | 6 | 1 | 7/8 | 8085 |

MODULATION AND CODING SCHEME CODES

CROSS-REFERENCE TO RELATED APPLICATIONS

This application claims the benefit of U.S. Provisional Application No. 62/241,363 filed Oct. 14, 2015 and U.S. Non-Provisional application Ser. No. 14/978,293 filed Dec. 22, 2015 the disclosure of which is incorporated herein by reference as if set forth in full.

TECHNICAL FIELD

This disclosure generally relates to systems and methods for wireless communications and, more particularly, to usage of modulation and coding scheme codes for wireless communications.

BACKGROUND

Wireless devices are becoming widely prevalent and are increasingly requesting access to wireless channels at higher speeds. A next generation wireless networking providing 60 GHz spectrum is under development in order to alleviate the increased demands. Modulation and Coding Scheme (MCS) index values may determine a likely data rate of a Wi-Fi connection.

BRIEF DESCRIPTION OF THE DRAWINGS

FIG. 2 depicts an illustrative table for Institute of Electrical and Electronics Engineers (IEEE) 802.11ad set of MCS for single carrier (SC) modulation.

FIG. 3 depicts an illustrative table of a set of MCS for SC modulation, in accordance with one or more example embodiments of the present disclosure.

DETAILED DESCRIPTION

Figure 1:
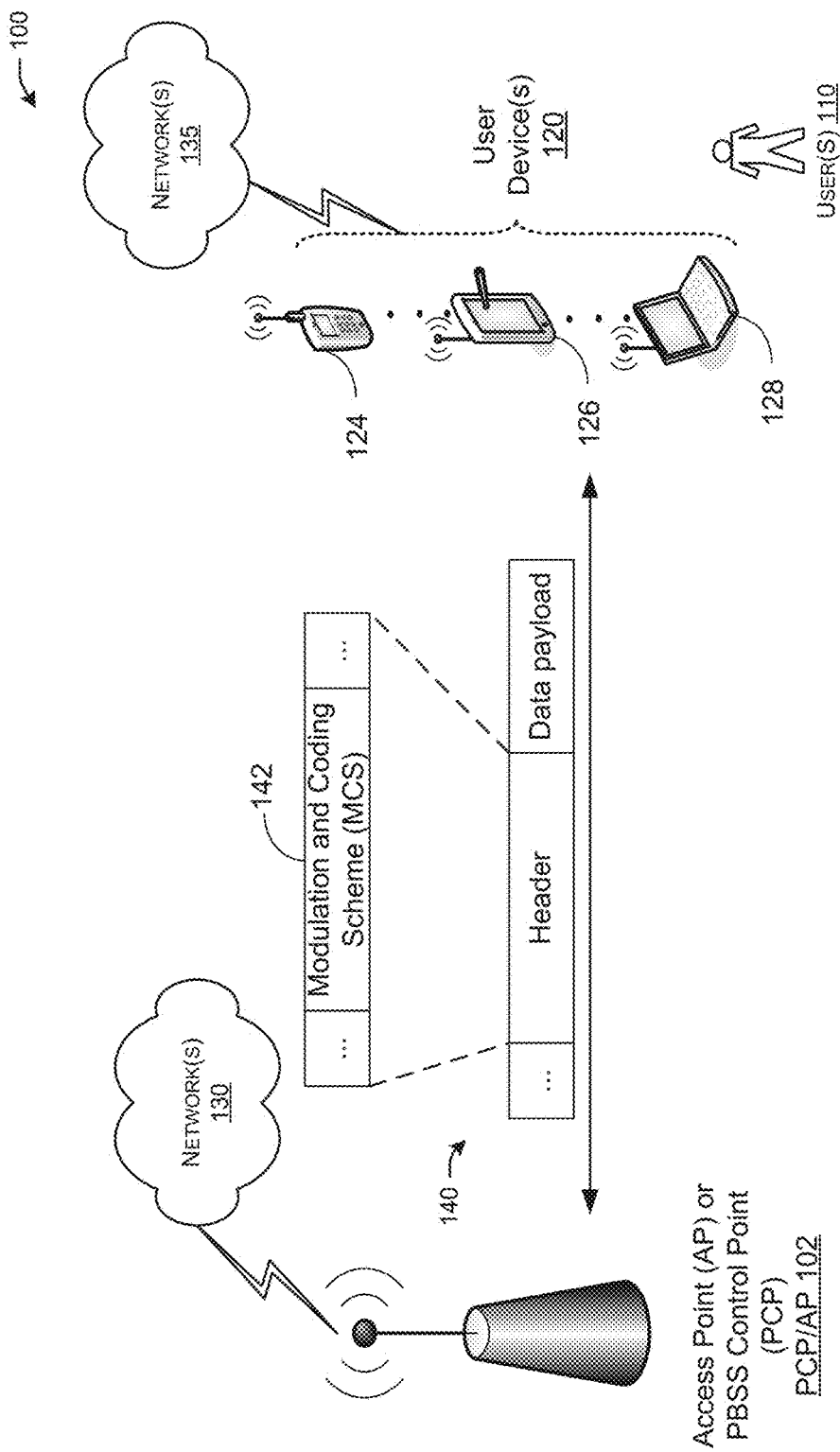
FIG. 1 depicts a network diagram illustrating an example network environment of an illustrative modulation and coding scheme codes system, in accordance with one or more example embodiments of the disclosure.

Example embodiments described herein provide certain systems, methods, and devices, for providing signaling information to Wi-Fi devices in various Wi-Fi networks.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

During communication between two or more devices in a 60 GHz spectrum range, devices may send and receive data frames in accordance with the communications standard, such as Wi-Fi family of standards, including IEEE 802.11ad and IEEE 802.11ay. Communication standard in the 60 GHz spectrum range may include one or more modulation and coding scheme codes (MCSs) associated with multiple-input multiple-output (MIMO), channel bonding MCS, or higher modulations formats such as 256 quadrature amplitude modulation (QAM). The one or more MCSs are represented by index values, which may be used to determine the likely data rate of a Wi-Fi connection during a wireless communication between two devices. The one or more MCSs carry information of modulation and coding scheme used for the payload. This may help a receiver decode the payload carried in the respective packet/frame. QAM is a format used in a variety of communications systems such as Wi-Fi. QAM is a form of modulation that is a combination of phase modulation and amplitude modulation. The QAM scheme represents bits, as points in a quadrant grid know as a constellation map.

When the two or more devices communicate using a 60 GHz wireless communications system, one or more MCS index values may be selected during the wireless communication as a means to exchange the type of modulation and rate at which to communicate based on network or environment condition. The modulation may be any one of single carrier (SC) modulation, spread-spectrum modulation, or orthogonal frequency division multiplex (OFDM) modulation. Typically, the MCS index value may be sent/received between the devices using a data or control packet header. The devices would then transmit data packets based on a selected MCS value, specifying at least in part a modulation scheme and a transmission rate that may be appropriate for the communication.

Communications between the one or more devices occur at a physical layer and at a MAC layer level. The physical layer helps encode the MAC layer data packet suitable to be transmitted over an air interface. In general, the physical layer may be composed of one or more hardware devices, such as, scrambler, LDPC encoder or RS encoder used as FEC techniques, modulation, interleaver, guard insertion, spectrum shaping, RF up conversion, etc.

Example embodiments of the present disclosure relate to systems, methods, and devices for modulation and coding scheme code (MCS) system.

In one embodiment, the MCS system may facilitate the use of one or more new MCS index values for single carrier modulation (SC), in order to improve the performance and data throughput of a 60 GHz wireless communications system. For example, new MCS index values may be based on a new low-density parity-check (LDPC) code rate (e.g., 7/8).

In one embodiment, 64-QAM may be introduced as an additional modulation for SC. One or more LDPC code rates may be associated with the 64-QAM modulation (e.g., rates 5/8, 3/4, 13/16, 7/8). A new LDPC matrix representing the code rate of 7/8 may be introduced to the new MCS values. Due to a large gap in performance between MCS values 9 and 10 in IEEE 802.11ad, the 7/8 rate may be utilized in order to mitigate that gap in performance. Additionally, code rates of 13/16 and 7/8 may also be added to 16-QAM (above MCS 12), where there is a large gap in performance between MCS12 and 64-QAM code rate 5/8. The 64-QAM MCSs may increase the data rate of single carrier MCSs. New MCS index values for quadrature phase shift keying (QPSK) and QAM modulation types may improve link adaptation. Link adaptation is the ability to adapt the modulation scheme and the coding rate of the error correction according to the quality of the radio link. If the conditions of the radio link are good, a high-level efficient modulation scheme and a small amount of error correction is used.

FIG. 1 is a network diagram illustrating an example network environment, according to some example embodiments of the present disclosure. Wireless network 100 may include one or more devices 120 and one or more PCP/AP 102, where AP refers to an access point and PCP refers to a personal basic service set (PBSS) control point (PCP). The PCP/AP 102 may communicate in accordance with IEEE 802.11 communication standards, including 60 GHz IEEE 802.11ad or IEEE 802.11ay. The device(s) 120 may be mobile devices that are non-stationary and do not have fixed locations.

In some embodiments, the PCP/AP 102 may be a non PCP or AP device. This may happen in a network where two devices (e.g., handheld devices) exchange information while neither of them is the PCP/AP.

Figure 5:
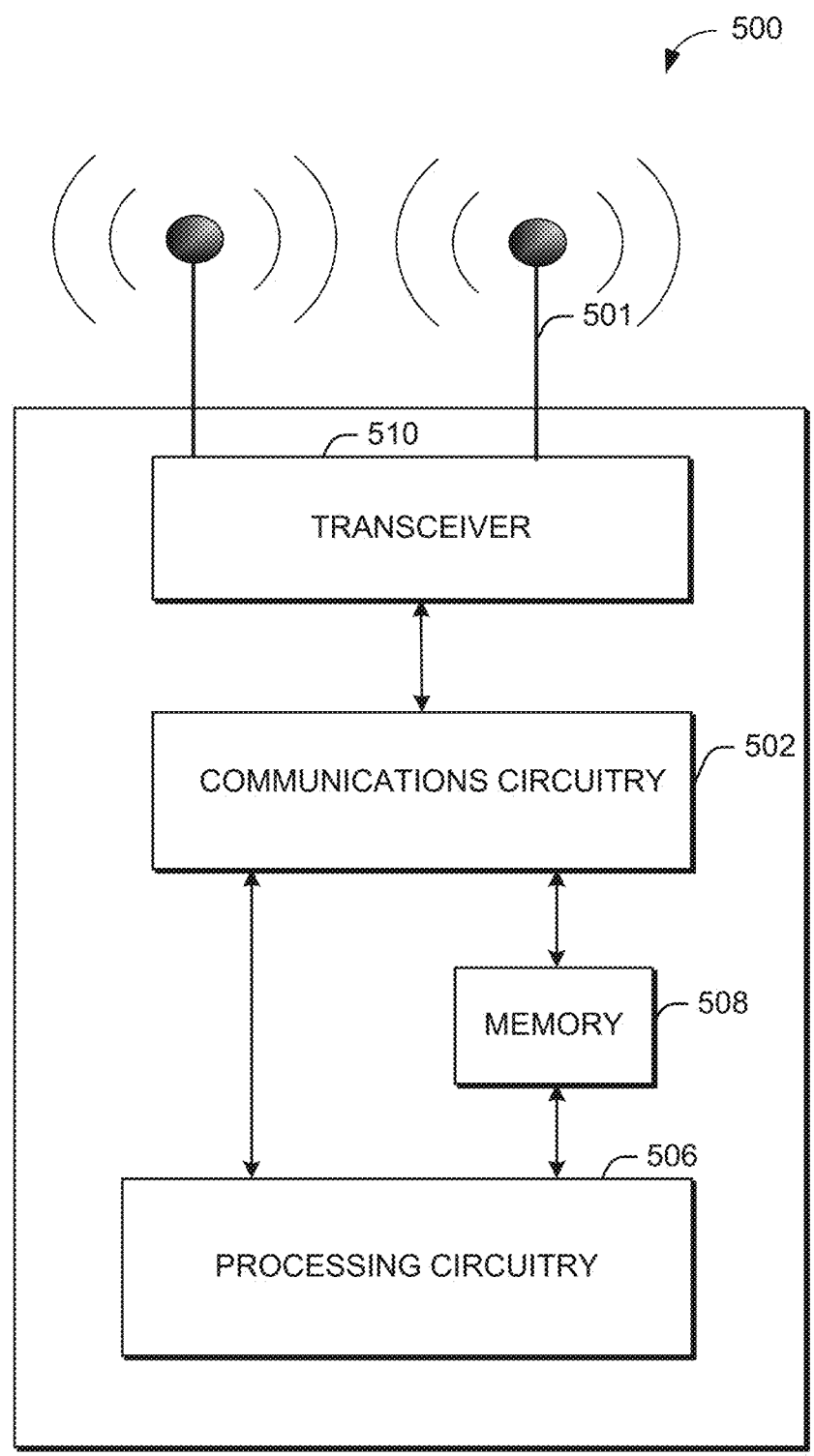
FIG. 5 illustrates a functional diagram of an example communication station that may be suitable for use as a user device, in accordance with one or more example embodiments of the disclosure.
Figure 6:
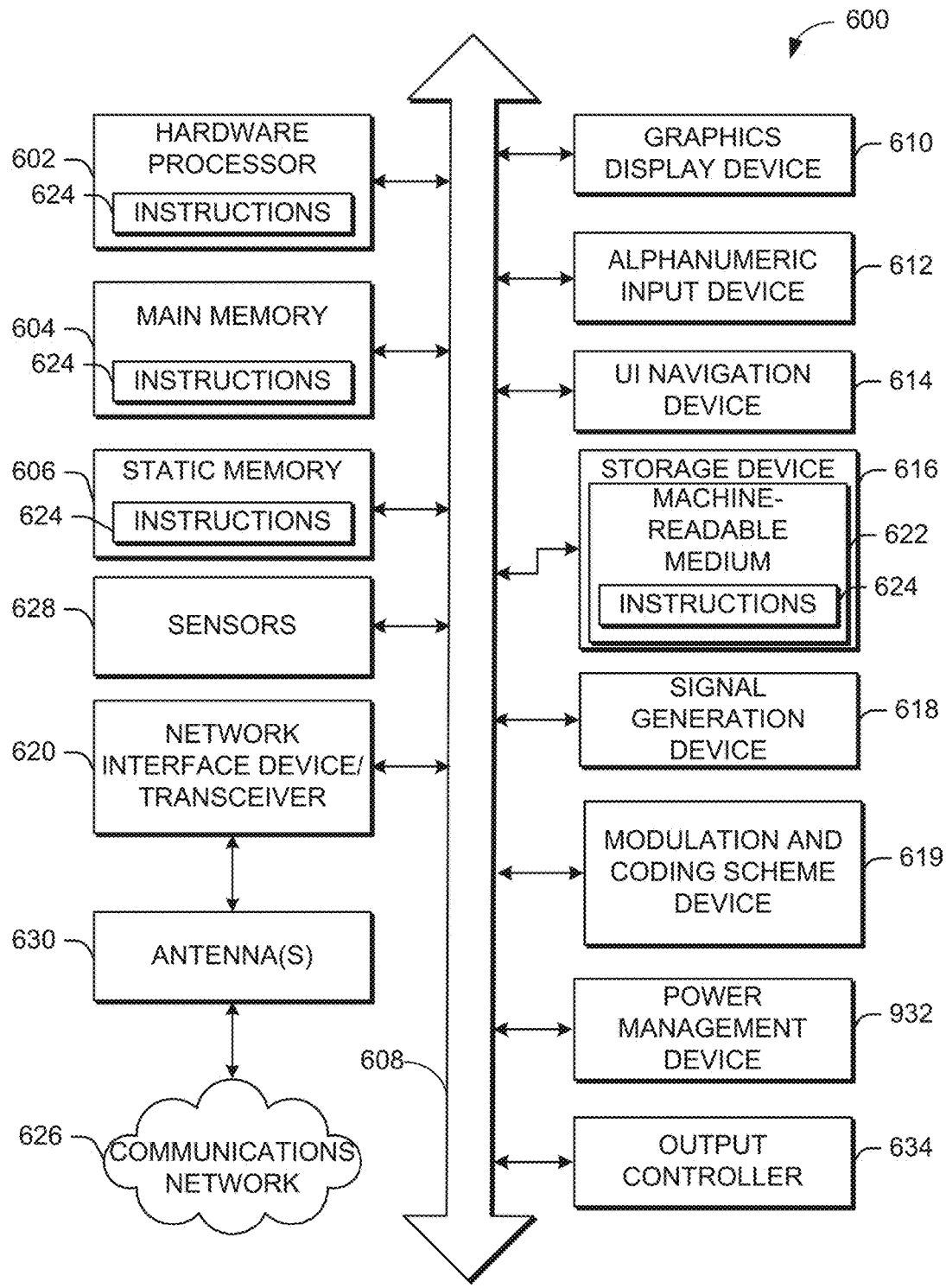
FIG. 6 is a block diagram of an example machine upon which any of one or more techniques (e.g., methods) may be performed, in accordance with one or more embodiments of the disclosure.

In some embodiments, the user devices 120 and PCP/AP 102 may include one or more computer systems similar to that of the functional diagram of FIG. 5 and/or the example machine/system of FIG. 6.

One or more illustrative user device(s) 120 may be operable by one or more user(s) 110. The user device(s) 120 (e.g., 124, 126, or 128) may include any suitable processor-driven user device including, but not limited to, a desktop user device, a laptop user device, a server, a router, a switch, an access point, a smartphone, a tablet, wearable wireless device (e.g., bracelet, watch, glasses, ring, etc.) and so forth.

Any of the user device(s) 120 (e.g., user devices 124, 126, 128), and PCP/AP 102 may be configured to communicate with each other via one or more communications networks 130 and/or 135 wirelessly or wired. Any of the communications networks 130 and/or 135 may include, but not limited to, any one of a combination of different types of suitable communications networks such as, for example, broadcasting networks, cable networks, public networks (e.g., the Internet), private networks, wireless networks, including 60 GHz channels, cellular networks, or any other suitable private and/or public networks. The 60 GHz channel may include a range of frequency bands around, for example, 57-64 GHz. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128), and PCP/AP 102 may include one or more communications antennae. Communications antenna may be any suitable type of antenna corresponding to the communications protocols used by the user device(s) 120 (e.g., user devices 124, 124 and 128), and PCP/AP 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, phase array antennas, or the like. The communications antenna may be communicatively coupled to a radio component to transmit and/or receive signals, such as communications signals to and/or from the user devices 120.

Any of the user devices 120 (e.g., user devices 124, 126, 128), and PCP/AP 102 may include any suitable radio and/or transceiver for transmitting and/or receiving radio frequency (RF) signals in the bandwidth and/or channels corresponding to the communications protocols utilized by any of the user device(s) 120 and PCP/AP 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n), 5 GHz channels (e.g. 802.11n, 802.11ac), or 60 GHZ channels (e.g. 802.11ad, and 802.11ay). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

Various modulation schemes and coding rates may be defined by a wireless standard, which may be represented by an MCS index value. MCS index values may be used to determine the likely data rate of a Wi-Fi connection during a wireless communication between two devices (e.g., between PCP/AP 102 and a user device 120). The MCS index value determines the modulation type and the code rate (e.g., 1/2, 2/3, 3/4, 5/6) that is possible two devices communicate. The modulation types may include binary phase shift keying (BPSK), QPSK, and QAM. It is understood that modulation is the method by which data is communicated through the air. The more complex modulations may require better conditions such as less interference and a good line of sight. The code rate may be represented by the proportion of the data-stream that is useful (non-redundant). That is, if the code rate is k/n, for every k bits of useful information, the coder generates total n bits of data, of which (n−k) are redundant. Effectively, the code rate may be an indication of how much of a data stream is actually being used to transmit usable data. For example, a 5/6 code rate may indicate that 83.3% of the data stream is being used. The actual MCS may depend on variables such as hardware design and local interferences that may affect the rate and the network performance during the communication. For example, if a wireless or Wi-Fi connection cannot be maintained when there are too many errors being experienced during the communication between the two devices, the MCS value may be lowered by selecting a different modulation type and/or coding rate in order to reduce the error rate. Although MCS may indicate the data rate of the wireless or Wi-Fi connection, it may not determine the actual throughput of the network.

In one embodiment and with reference to FIG. 1, an IEEE 802.11 standard, such as, IEEE 802.11ad and/or IEEE 802.11ay may use data frames (e.g., data frame 140) that may include, among other fields, a header and payload data. The header field may convey information about the rest of the packet. The header may signal the MCS index value being used for the payload part of the packet. That is, the header may include, at least in part an MCS index value (e.g., MCS 142) that may be transmitted from one device to another in order to signal information about modulation format and coding rate that may be used by the receiving device when decoding the data, such as the payload part of the packet.

According to IEEE 802.11 ad, MCS index values 1 through 12 (MCS1-MCS12) employ single-carrier modulation such as, BPSK, QPSK, or 16-QAM modulation. All 12 modes are similar in their channel encoding steps but differ in the choice of low-density parity-check (LDPC) codes as the main form of forward error correction based on code rates, to allow the appropriate tradeoff between throughput and robustness. These 12 modes are collectively referred to as the single carrier PHY (SCPHY). For IEEE 802.11ad, the LDPC error correcting coding technique used for SCPHY is based on a common codeword length of 672 bits each carrying either 336, 504, 420 or 546 payload bits to achieve rate 1/2, 3/4, 5/8 or 13/16 code rates as required.

In the example of FIG. 1, an MCS system may facilitate communications between two or more devices, (e.g., between PCP/AP 102 and one or more user devices 120) by using modified MSC index values for enhanced link adaptation.

PCP/AP 102 may generate a data frame 140 to be sent to at least one of the one or more user devices 120. The data frame may include an MCS index value based at least in part on one or more factors associated with the communication channel between PCP/AP 102 and the one or more user devices 120. The one or more factors may include error rates, hardware design factors, local interferences, or other factors that may affect the communication channel. Although FIG. 1 shows PCP/AP 102 communicating with at least one of user devices 120, it should be appreciated that communications may be between two or more user devices 120, two or more PCP/AP 102, or any combination thereof.

In one embodiment, MCSs for single carrier modulation may use a low-density parity-check (LDPC) code rate, for example of 7/8, and additional 64-QAM MCSs.

In one embodiment, 64-QAM may be introduced as an additional modulation for SC over what exists in IEEE 802.11ad. For this modulation LDPC code rates may be: 5/8, 3/4, 13/16, 7/8. The rate of 7/8 may require a new LDPC matrix. This rate may be also added to QPSK (between MCS 9 and 10, where a large gap in performance over channels exist). Code rates of 13/16 and 7/8 may also be added to 16-QAM (above MCS 12), where a large gap in performance between MCS12 and 64-QAM code rate 5/8. Next generation 60 GHz (NG60) and IEEE 802.11 standards do not include these MCSs and the LDPC rate 7/8 code. The 64-QAM MCSs may enable increasing the data rate of SC MCSs without needing to use schemes such as bonding or MIMO. The new QPSK and 16-QAM MCS's may improve link adaptation, as they may decrease the performance gap between the MCS9 and MCS10, and between MCS12 and the lowest 64-QAM MCS.

FIG. 2 depicts an illustrative table 200 for IEEE 802.11ad set of MCS index values for single carrier modulation.

Specific MCS index values may be selected during the wireless communication as a means to exchange the type of modulation and rate at which to communicate based on network or environment condition. The table in FIG. 2 shows the MCS index values 1 through 12 linked to modulations, such as π/2-BPSK and 16-QAM, with equivalent number of coded bits per OFDM symbol ($N_{CBPS}$) values, repetitions, code rates, and data rates.

These MCS index values may allow two devices to adjust, at least in part, the modulation format and rate of transmission. The MCS may be sent/received between the two devices using a data or control packet header. The devices would then transmit data packets based on a selected MCS value, specifying at least in part a modulation scheme and a transmission rate that may be appropriate for the communication.

FIG. 3 depicts an illustrative table 300 of a set of MCS for SC, in accordance with one or more embodiments of the disclosure.

In one embodiment, a parity matrix may be defined based at least in part on new MCS index values as shown in table 300. MCS index values associated with table 300 may be employed during wireless communications in accordance with various standards, such as, IEEE 802.11ad. For example, the new MCS index values may be introduced in order to improve the performance and data throughput. The new MCS index values may be suitable for 60 GHz wireless communication systems, such as, but not limited to, IEEE 802.11ad and IEEE 802.11ay.

In one embodiment, table 300 shows a new set of MCSs for single carrier for index values, 10, and 14-19. For example, row 302 shows that the a new MCS index 10 is linked to modulation π/2-BPSK, $N_{CBPS}$ value of 2, repetition of 1, code rate of 7/8 and data rate of 2695 Mbps. In the same manner, rows 303 include various MCS index values, which are linked to various modulations, $N_{CBPS}$ values, repetitions, code rates, and data rates. The new MCSs index values associated with the new rate 7/8 may include MCS index values 10, 15, and 19. As can be seen in table 300, MCS index 10 utilizes π/2-QPSK modulation format. MCS index value 15 utilizes 16-QAM modulation format, and MCS index value 19, utilizes 64-QAM modulation format. It is understood that the use of the new rate of 7/8 in table 300 may also be used for MCS index values other than 10, 15, and 19.

In one embodiment, a new parity matrix for code rate of 7/8 may be implemented using the LDPC coding matrix. The LDPC coding matrix for the code rate 7/8 may be implemented to include a two-dimensional matrix. The matrix may be defined as follows:

$$\begin{pmatrix} 37 & 31 & 18 & 23 & 11 & 21 & 6 & 20 & 32 & 9 & 12 & 29 & 10 & 0 & 13 & -1 \\ 25 & 22 & 4 & 34 & 31 & 3 & 14 & 15 & 4 & 2 & 14 & 18 & 13 & 13 & 22 & 24 \end{pmatrix}$$

Each element of the matrix may represent a cyclic permutation matrix of size 42×42. The number may represent the cyclic shift applied to the elements of the matrix, with the shift amount given by the number. The −1 entry may denote a zero matrix of size 42×42. The advantage of this matrix may be that it enables reuse of LDPC encoding/decoding hardware designed for IEEE 802.11ad existing MCSs. A 42-input barrel shifter may be used to implement the sub-matrix shifts specified by each entry of the matrix. A barrel shifter is a digital circuit that can shift a data word by a specified number of bits in one clock cycle. It can be implemented as a sequence of multiplexers, and in such an implementation the output of one mux is connected to the input of the next mux in a way that depends on the shift distance.

In one embodiment, the above LDPC coding matrix may be used for π/2-QPSK, with code rate 7/8. All other transmitter functions (such as scrambler, π/2 rotation, bit to symbol mapping) may be the same as for the existing π/2-QPSK MCSs in IEEE 802.11ad. This may maintain compatibility with other Wi-Fi standards, such as IEEE 802.11ad.

In one embodiment, for 16-QAM, with code rate 13/16, the rate 13/16 LDPC coding matrix as defined in 802.11ad may be used. All other transmitter functions (such as scrambler, π/2 rotation, bit to symbol mapping) are the same as for the existing 16-QAM MCS's in IEEE 802.11ad. This may allow for backward compatibility with hardware utilized by IEEE 802.11ad, such as encoders and decoders, or the like.

In one embodiment, the LDPC coding matrix for code rate 7/8 may be used with π/2-QPSK, 16-QAM, and 64-QAM. Additionally, other transmitter functions (such as scrambler, π/2 rotation, bit to symbol mapping) may be the same as for the existing 16-QAM MCS's in IEEE 802.11ad, for backward compatibility purpose. Further, the bit to symbol mapping of the 64-QAM in SC may be the same as the mapping of the 64-QAM in the OFDM section of the IEEE 802.11ad standard. It is understood that for code rates 5/8, 1/2, 3/4, and 13/16, the corresponding LDPC matrices may be utilized as defined in IEEE 802.11ad. It is understood that the above are only examples of various MCS index values correlated to various modulations, NCBPS values, repetitions, code rates, and or data rates, and that other MCS index values and correlations may be employed may be employed.

Figure 4:
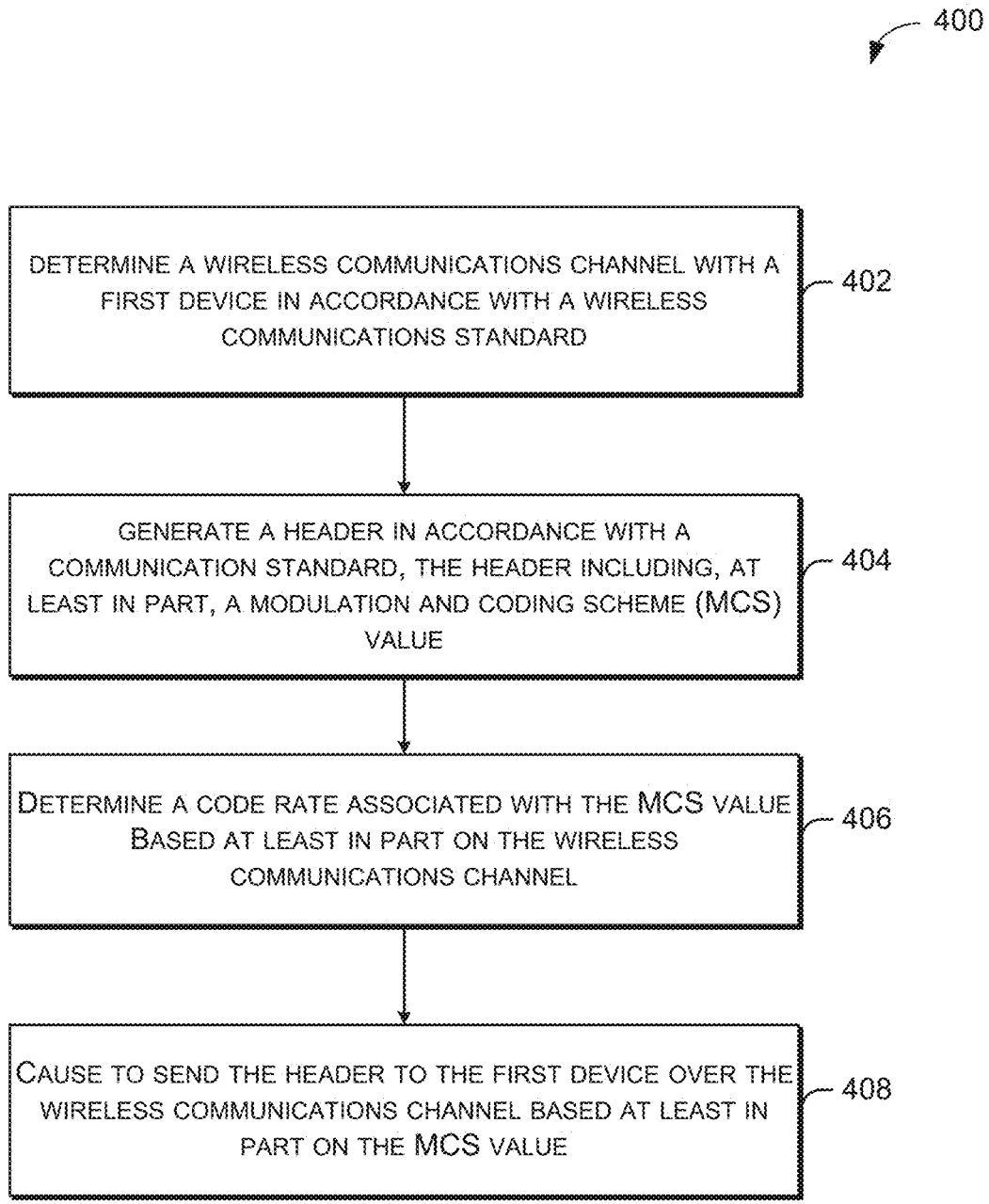
FIG. 4 illustrates a flow diagram of illustrative process for a modulation and coding scheme codes system, in accordance with one or more example embodiments of the disclosure.

FIG. 4 illustrates a flow diagram of illustrative process 400 for a modulation and coding scheme codes system in accordance with one or more embodiments of the disclosure.

At block 402, a device (e.g., PCP/AP 102 or user device 120 of FIG. 1) may determine a wireless communications channel with a first device in accordance with a wireless communications standard. For example, during communication between two or more devices in a 60 GHz spectrum range, devices may send and receive data frames using standard formats in accordance with the communications standard, such as Wi-Fi family of standards, including IEEE 802.11ad and IEEE 802.11ay.

At block 404, the device may generate a header in accordance with a communication standard, the header including, at least in part, a modulation and coding scheme (MCS) index value. RF burst transmissions between two or more devices may start with a synchronization preamble followed by header and payload data a data frame. The header field that conveys information about the rest of the packet. The header may signal the MCS index value being used for the payload part of the packet. This in turn would allow a receiving device to know what modulation type was used and what coding rate was used by the transmitting device. There may be a list of new and modified MCS index values, in accordance with IEEE 802.11ad and/or IEEE 802.11ay such that the MCS index values are from 1-19. These MCS index values may utilize various modulation types. For example, π/2-QPSK modulation type, 16-QAM modulation type, or 64-QAM modulation type may be used in single carrier (SC) modulation.

At block 406, the device may determine a code rate associated with the MCS index value based at least in part on the wireless communications channel. The code rate associated with an MCS index may indicate the coding rate used by the transmitting device. The MCS system may facilitate the use of a new coding rate (e.g., rate 7/8). The new coding rate of 7/8 may be a low-density parity-check (LDPC) code rate. One or more MCS index values may be associated with the rate 7/8. For example, new MSC index values 10, 15 and 19 may have modulation formats of π/2-QPSK, 16-QAM and 64-QAM respectively. It is understood that other MSC index values may also be associated with the code rate 7/8.

At block 408, the device may cause to send the header to the first device over the wireless communications channel based at least in part on the MCS index value.

FIG. 5 shows a functional diagram of an exemplary communication station 500 in accordance with some embodiments. In one embodiment, FIG. 5 illustrates a functional block diagram of a communication station that may be suitable for use as a PCP/AP 102 (FIG. 1) or communication station user device 120 (FIG. 1) in accordance with some embodiments. The communication station 500 may also be suitable for use as a handheld device, mobile device, cellular telephone, smartphone, tablet, netbook, wireless terminal, laptop computer, wearable computer device, femtocell, High Data Rate (HDR) subscriber station, access point, access terminal, or other personal communication system (PCS) device.

The communication station 500 may include communications circuitry 502 and a transceiver 510 for transmitting and receiving signals to and from other communication stations using one or more antennas 501. The communications circuitry 502 may include circuitry that can operate the physical layer communications and/or medium access control (MAC) communications for controlling access to the wireless medium, and/or any other communications layers for transmitting and receiving signals. The communication station 500 may also include processing circuitry 506 and memory 508 arranged to perform the operations described herein. In some embodiments, the communications circuitry 502 and the processing circuitry 506 may be configured to perform operations detailed in FIGS. 2-4.

In accordance with some embodiments, the communications circuitry 502 may be arranged to contend for a wireless medium and configure frames or packets for communicating over the wireless medium. The communications circuitry 502 may be arranged to transmit and receive signals. The communications circuitry 502 may also include circuitry for modulation/demodulation, upconversion/downconversion, filtering, amplification, etc. In some embodiments, the processing circuitry 506 of the communication station 500 may include one or more processors. In other embodiments, two or more antennas 501 may be coupled to the communications circuitry 502 arranged for sending and receiving signals. The memory 508 may store information for configuring the processing circuitry 506 to perform operations for configuring and transmitting message frames and performing the various operations described herein. The memory 508 may include any type of memory, including non-transitory memory, for storing information in a form readable by a machine (e.g., a computer). For example, the memory 508 may include a computer-readable storage device may, read-only memory (ROM), random-access memory (RAM), magnetic disk storage media, optical storage media, flash-memory devices and other storage devices and media.

In some embodiments, the communication station 500 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 500 may include one or more antennas 501. The antennas 501 may include one or more directional or omnidirectional antennas, including, for example, dipole antennas, monopole antennas, patch antennas, phased array antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 500 may include one or more of a keyboard, a display, a non-volatile memory port, multiple antennas, a graphics processor, an application processor, speakers, and other mobile device elements. The display may be an LCD screen including a touch screen.

Although the communication station 500 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 500 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 500 may include one or more processors and may be configured with instructions stored on a computer-readable storage device memory.

FIG. 6 illustrates a block diagram of an example of a machine 1000 or system upon which any one or more of the techniques (e.g., methodologies) discussed herein may be performed. In other embodiments, the machine 1000 may operate as a standalone device or may be connected (e.g., networked) to other machines. In a networked deployment, the machine 1000 may operate in the capacity of a server machine, a client machine, or both in server-client network environments. In an example, the machine 1000 may act as a peer machine in peer-to-peer (P2P) (or other distributed) network environments. The machine 1000 may be a personal computer (PC), a tablet PC, a set-top box (STB), a personal digital assistant (PDA), a mobile telephone, wearable computer device, a web appliance, a network router, switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618 (e.g., a speaker), an MCS device 619, a network interface device/transceiver 620 coupled to antenna(s) 630, and one or more sensors 628, such as a global positioning system (GPS) sensor, compass, accelerometer, or other sensor. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, card reader, etc.)).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

The MCS device 619 may be carried out or performed any of the operations and processes (e.g., process 400) described and shown above. For example, MCS device 619 may be configured to introduce new MCS values may be determined by the MCS system for single carrier modulation (SC). For example, then new MCS values may be based on a new low-density parity-check (LDPC) code rate (e.g., 7/8). The MCS codes device may be configured to introduce 64-QAM as an additional modulation for SC over what exists in IEEE 802.11ad. One or more LDPC code rates may be associated with the 64-QAM modulation (e.g., rates 5/8, 3/4, 13/16, 7/8). A new LDPC matrix representing the rate of 7/8 may be introduced to the new MCS values. Due to a large gap in performance between MCS values 9 and 10, the 7/8 rate may be utilized in order to mitigate that gap in performance. Additionally, code rates of 13/16 and 7/8 may also be added to 16-QAM (above MCS 12), where there is a large gap in performance between MCS12 and 64-QAM code rate 5/8. The 64-QAM MCSs may increase the data rate of single carrier MCSs. The new QPSK and 16-QAM MCS's may improve link adaptation, as they may decrease the performance gap between the MCS 9 and MCS 10, and between MCS 12 and the lowest 64-QAM MCS.

64-QAM as an additional modulation for SC over what exists in IEEE 802.11ad. For this modulation LDPC code rates may be: 5/8, 3/4, 13/16, 7/8. The rate of 7/8 may require a new LDPC matrix. This rate may be also added to QPSK (between MCS 9 and 10, where a large gap in performance over channels exist). Code rates of 13/16 and 7/8 may also be added to 16-QAM (above MCS 12), where a large gap in performance between MCS12 and 64-QAM code rate 5/8. Current next generation 60 GHz (NG60) and IEEE 802.11 standards do not include these MCSs nor the LDPC rate 7/8 code. The 64-QAM MCSs may enable increasing the data rate of SC MCS's without needing to use schemes such as bonding or MIMO. The new QPSK and 16-QAM MCSs may improve link adaptation, as they may decrease the performance gap between the MCS9 and MCS10, and between MCS12 and the lowest 64-QAM MCS.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., Electrically Programmable Read-Only Memory (EPROM), or Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), Plain Old Telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device", "user device", "communication station", "station", "handheld device", "mobile device", "wireless device" and "user equipment" (UE) as used herein refers to a wireless communication device such as a cellular telephone, smartphone, tablet, netbook, wireless terminal, laptop computer, a femtocell, High Data Rate (HDR) subscriber station, access point, printer, point of sale device, access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as 'communicating', when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

The term "access point" (AP) as used herein may be a fixed station. An access point may also be referred to as an access node, a base station, or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates a Radio Frequency Identification (RFID) element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems following one or more wireless communication protocols, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems, and/or networks.

In example embodiments of the disclosure, there may be a device. The device may include at least one memory that stores computer-executable instructions; and at least one processor of one or more processors configured to access the at least one memory, wherein the at least one processor may be configured to execute the computer-executable instructions to determine a wireless communication channel with a first device in accordance with a wireless communication standard. the at least one processor may be configured to execute the computer-executable instructions to generate a preamble in accordance with a communication standard, the preamble including, at least in part, one or more legacy signal fields, one or more signal fields, and one or more training fields; determine a modulation and coding scheme (MCS) value based at least in part on the communication channel. the at least one processor may be configured to execute the computer-executable instructions to cause to send the preamble to the first device over the wireless communication channel based at least in part on the MCS value.

Implementations may include one or more of the following features. The MCS value is associated, with at least in part, one or more modulation types and one or more code rates. The one or more modulation types are at least one of a $\pi/2$-QPSK modulation, 16-QAM modulation or 64-QAM modulation. The $\pi/2$-QPSK modulation is associated with a 7/8 code rate of the one or more code rates. The MCS value is included in one of the one or more legacy signal fields or the signal fields. The device further comprising a transceiver configured to transmit and receive wireless signals. The device further comprising an antenna coupled to the transceiver.

In example embodiments of the disclosure, there may be a non-transitory computer-readable medium. The non-transitory computer-readable medium may store computer-executable instructions which when executed by one or more processors result in performing operations comprising determining a wireless communication channel with a first device in accordance with a wireless communication standard, generating a preamble in accordance with a communication standard, the preamble including, at least in part, one or more legacy signal fields, one or more signal fields, and one or more training fields, determining a modulation and coding scheme (MCS) value based at least in part on the communication channel, and causing to send the preamble to the first device over the wireless communication channel based at least in part on the MCS value.

Implementations may include one or more of the following features. The MCS value is associated, with at least in part, one or more modulation types and one or more code rates. The one or more modulation types are at least one of a π/2-QPSK modulation, 16-QAM modulation or 64-QAM modulation. The non-transitory computer-readable medium wherein the π/2-QPSK modulation is associated with a 7/8 code rate of the one on more code rates. The MCS value is included in one of the one or more legacy signal fields or the signal fields.

In example embodiments of the disclosure, there may be a method. The method may include determining a wireless communication channel with a first device in accordance with a wireless communication standard, generating a preamble in accordance with a communication standard, the preamble including, at least in part, one or more legacy signal fields, one or more signal fields, and one or more training fields, determining a modulation and coding scheme (MCS) value based at least in part on the communication channel, and causing to send the preamble to the first device over the wireless communication channel based at least in part on the MCS value.

Implementations may include one or more of the following features. The MCS value is associated, with at least in part, one or more modulation types and one or more code rates. The MCS value is included in one of the one or more legacy signal fields or the signal fields. The one or more modulation types are at least one of a π/2-QPSK modulation, 16-QAM modulation or 64-QAM modulation. The π/2-QPSK modulation is associated with a 7/8 code rate of the one on more code rates.

In example embodiments of the disclosure, there may be an apparatus. The apparatus may include means for determining a wireless communications channel with a first device in accordance with a wireless communications standard. The apparatus may include means for generating a header in accordance with a communication standard, the header including, at least in part, a modulation and coding scheme (MCS) index value. The apparatus may include means for determining a code rate associated with the MCS index value based at least in part on the wireless communications channel. The apparatus may include means for causing to send the header to the first device over the wireless communications channel based at least in part on the MCS index value.

Implementations may include one or more of the following features. the MCS index value is associated, with at least in part, one or more modulation types and one or more code rates. the one or more modulation types are at least one of a π/2-quadrature phase shift keying (π/2-QPSK) modulation, 16-quadrature amplitude modulation (16-QAM) modulation, or 64-QAM modulation. the π/2-QPSK modulation is associated with a 7/8 code rate of the one or more code rates. MCS index value 10 is associated with a π/2-QPSK modulation and a 7/8 code rate of the one or more code rates. the 7/8 code rate is a low-density parity-check (LDPC) code rate.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device for indicating a modulation and coding scheme (MCS) index in one or more frames to be sent to one or more station devices (STAs), the device comprising storage and processing circuitry configured to:

determine a frame of the one or more frames, the frame having a header and a data payload, wherein the header comprises one or more fields, wherein at least one field of the one or more fields of the frame includes an indication of the MCS index;

determine a low-density parity-check (LDPC) code rate of 7/8 represented by a LDPC matrix comprising two rows and sixteen columns of elements, wherein each element represents a cyclic permutation matrix of size 42 by 42, wherein a first element, of the LDPC matrix, located at the first row and at the sixteenth column represents a zero matrix and a second element, of the LDPC matrix, located at the second row and at the sixteenth column has a value of 24;

determine the modulation and coding scheme (MCS) index based on the LDPC code rate; and cause to send the frame to a first STA of the one or more STAs using a modulation type associated with the MCS index.

2. The device of claim 1, wherein the modulation type is based on at least one of a π/2-quadrature phase shift keying (π/2-QPSK) modulation, 16-quadrature amplitude modulation (16-QAM) modulation, or 64-QAM modulation.

3. The device of claim 1, wherein the MCS index is associated with the modulation type of π/2-quadrature phase shift keying (π/2-QPSK), a number of coded bits per second of 2, a repetition of 1, and the code rate of 7/8.

4. The device of claim 1, wherein the storage and the processing circuitry are further configured to determine a second MCS index to communicate with a second STA of the one or more STAs using a second LDPC code rate.

5. The device of claim 1, wherein the MCS index is associated with a single carrier mode.

6. The device of claim 1, wherein the storage and the processing circuitry are further configured to determine a wireless communication channel, wherein the communication channel is based on a 60 GHz frequency band.

7. The device of claim 1, further comprising a transceiver configured to transmit and receive wireless signals.

8. The device of claim 7, further comprising an antenna coupled to the transceiver.

9. A non-transitory computer-readable medium storing computer-executable instructions which when executed by one or more processors result in performing operations comprising:

determining a frame of one or more frames, the frame having a header and a data payload, wherein the header comprises one or more fields, wherein at least one field of the one or more fields of the frame includes an indication of an modulation and coding scheme (MCS) index;

determining a low-density parity-check (LDPC) code rate of 7/8 represented by a LDPC matrix comprising two rows and sixteen columns of elements, wherein *each* element represents a cyclic permutation matrix of size 42 by 42, wherein a first element, of the LDPC matrix, located at the first row and at the sixteenth column represents a zero matrix and a second element, of the LDPC matrix, located at the second row and at the sixteenth column has a value of 24;

causing to send the frame to a first station device (STA) of one or more STAs using a modulation type associated with the MCS index.

10. The non-transitory computer-readable medium of claim 9, wherein the modulation type is based on at least one of a π/2-quadrature phase shift keying (π/2-QPSK) modulation, 16-quadrature amplitude modulation (16-QAM) modulation, or 64-QAM modulation.

11. The non-transitory computer-readable medium of claim 9, wherein the MCS index is associated with the modulation type of π/2-quadrature phase shift keying (π/2-QPSK), a number of coded bits per second of 2, a repetition of 1, and the code rate of 7/8.

12. The non-transitory computer-readable medium of claim 9, wherein the operations further comprise determining a second MCS index to communicate with a second STA of the one or more STAs using a second LDPC code rate.

13. The non-transitory computer-readable medium of claim 9, wherein the MCS index is associated with a single carrier.

14. The non-transitory computer-readable medium of claim 9, wherein the operations further comprise determining a wireless communication channel, wherein the communication channel is based on a 60 GHz frequency band.

15. A method comprising:

determining, by one or more processors, a frame of one or more frames, the frame having a header and a data payload, wherein the header comprises one or more fields, wherein at least one field of the one or more fields of the frame includes an indication of an modulation and coding scheme (MCS) index;

determining a low-density parity-check (LDPC) code rate of 7/8 represented by a LDPC matrix comprising two rows and sixteen columns of elements, wherein each element represents a cyclic permutation matrix of size 42 by 42, wherein a first element, of the LDPC matrix, located at the first row and at the sixteenth column represents a zero matrix and a second element, of the LDPC matrix, located at the second row and at the sixteenth column has a value of 24;

causing to send the frame to a first station device (STA) of one or more STAs using a modulation type associated with the MCS index.

16. The method of claim 15, wherein the modulation type is based on at least one of a π/2-quadrature phase shift keying (π/2-QPSK) modulation, 16-quadrature amplitude modulation (16-QAM) modulation, or 64-QAM modulation.

17. The method of claim 15, wherein the MCS index is associated with the modulation type of π/2-quadrature phase shift keying (π/2-QPSK), a number of coded bits per second of 2, a repetition of 1, and the code rate of 7/8.

* * * * *